United States Patent
Chen et al.

(10) Patent No.: US 12,271,207 B2
(45) Date of Patent: Apr. 8, 2025

(54) METHOD FOR CONTROLLING A PLURALITY OF ROBOTS FOR ENVIRONMENT MAINTENANCE

(71) Applicant: URSrobot AI Inc., Taipei (TW)

(72) Inventors: Chien-Tung Chen, Taipei (TW); Chung-Hou Wu, Taipei (TW); Chao-Cheng Chen, Taipei (TW); Wen-Wei Chiang, Taipei (TW); Yi-Jin Lin, Taipei (TW)

(73) Assignee: URSrobot AI Inc., Taipei (TW)

( * ) Notice: Subject to any disclaimer, the term of this patent is extended or adjusted under 35 U.S.C. 154(b) by 100 days.

(21) Appl. No.: 18/362,428

(22) Filed: Jul. 31, 2023

(65) Prior Publication Data

US 2024/0045443 A1    Feb. 8, 2024

(30) Foreign Application Priority Data

Aug. 3, 2022    (TW) .................................. 111129193

(51) Int. Cl.
    *G05D 1/00*      (2024.01)
(52) U.S. Cl.
    CPC .......... *G05D 1/0287* (2013.01); *G05D 1/0219* (2013.01)
(58) Field of Classification Search
    CPC .... G05D 1/0287; G05D 1/0219; G05D 1/648; G05D 2109/10; G05D 1/6987; G06Q 10/20
    See application file for complete search history.

(56) References Cited

U.S. PATENT DOCUMENTS

| | | | |
|---|---|---|---|
| 9,682,481 B2 * | 6/2017 | Lutz | B25J 5/007 |
| 10,623,734 B1 * | 4/2020 | Shen | H04L 43/0894 |
| 11,347,238 B2 * | 5/2022 | Pajovic | G05D 1/0274 |
| 2017/0113352 A1 * | 4/2017 | Lutz | B25J 9/1682 |
| 2017/0131721 A1 * | 5/2017 | Kwak | G05D 1/0044 |
| 2017/0361468 A1 * | 12/2017 | Cheuvront | G06F 3/16 |
| 2021/0103290 A1 * | 4/2021 | Pajovic | G05D 1/0287 |
| 2021/0154840 A1 * | 5/2021 | Vogel | B25J 9/1666 |
| 2021/0373558 A1 * | 12/2021 | Schneider | G05D 1/0016 |
| 2022/0066456 A1 * | 3/2022 | Ebrahimi Afrouzi | G06F 3/04883 |

(Continued)

FOREIGN PATENT DOCUMENTS

| | | | | |
|---|---|---|---|---|
| CN | 111708371 A | * | 9/2020 | G01C 21/343 |
| CN | 108287545 B | * | 8/2021 | G05D 1/0221 |

(Continued)

*Primary Examiner* — Ramon A. Mercado
*Assistant Examiner* — Shaheda Hoque
(74) *Attorney, Agent, or Firm* — Blank Rome LLP (57) ABSTRACT

A method for controlling a plurality of autonomous robots for performing environment maintenance operations includes: generating a setup command that indicates a selected location, a plurality of selected robots, an available time slot, and a distribution mode signal that indicates whether the selected robots are to be controlled based on the available time slot or an inputted priority section; and generating a plurality of sub-routes based on different parameters, depending on the distribution mode signal. The sub-routes are generated to be connected into an unbroken trail. Then, the sub-routes are transmitted to the selected robots, respectively, so as to control each of the selected robots to move along the respective one of the sub-routes.

10 Claims, 7 Drawing Sheets

(56) References Cited

U.S. PATENT DOCUMENTS

2022/0187841 A1\* 6/2022 Ebrahimi Afrouzi ........................ G05D 1/0274
2022/0269275 A1\* 8/2022 Munich ............... A47L 11/4061

FOREIGN PATENT DOCUMENTS

| CN | 114819416 A | * | 7/2022 | |
|----|----|----|----|----|
| CN | 117501197 A | * | 2/2024 | ............. G01C 21/20 |
| CN | 114706422 B | * | 8/2024 | ............. G05D 1/104 |
| EP | 4002049 A1 | * | 5/2022 | ......... G01C 21/3407 |
| EP | 4124949 A1 | * | 2/2023 | ........... G06F 9/4887 |
| EP | 4390599 A1 | * | 6/2024 | .......... A47L 11/4011 |
| JP | 2004098233 A | * | 4/2004 | .......... A47L 11/4011 |
| JP | 7429372 B2 | * | 2/2024 | ......... G01C 21/3407 |
| WO | WO-2016053194 A1 | * | 4/2016 | ............. B64C 39/00 |
| WO | WO-2022255989 A1 | * | 12/2022 | ............. G01C 21/20 |

\* cited by examiner

METHOD FOR CONTROLLING A PLURALITY OF ROBOTS FOR ENVIRONMENT MAINTENANCE

CROSS-REFERENCE TO RELATED APPLICATION

This application claims priority to Taiwanese Invention Patent Application No. 111129193, filed on Aug. 3, 2022.

FIELD

The disclosure relates to a controlling method, and more particularly to a method for controlling a plurality of autonomous robots for environment maintenance.

BACKGROUND

Nowadays, autonomous robots have been employed to perform a wide variety of tasks, including environment maintenance operations (e.g., grass mowing, floor cleaning, floor polishing, etc.) at a specific location. In the case the specific location that needs the maintenance operations has a relatively large area, a plurality of autonomous robots may be deployed to operate in coordination. Conventionally, the specific location may be first partitioned into a plurality of smaller sections that are to be maintained by the plurality of autonomous robots, respectively.

It is noted however that, typically, the maintenance operations can only be performed within a specific time window on a given day (e.g., from 08:00 to 17:00 or at night). In the case where the area of the specific location is so large to the extent that the maintenance operations cannot be completed within the specific time window, the specific location may look disorderly at the end of the day as various parts of the specific location that have not yet been maintained (e.g., some grasses have not been mowed yet) may be distributed at random. This is unacceptable in commercial settings.

SUMMARY

Therefore, an object of the disclosure is to provide a method for controlling a plurality of autonomous robots for environment maintenance.

According to one embodiment of the disclosure, the method for controlling a plurality of autonomous robots for performing environment maintenance operations is implemented using a system that includes the plurality of autonomous robots, a user device, and a server. The server stores a lookup table therein and is coupled to each of the plurality of autonomous robots and the user device. The lookup table includes a plurality of routes associated with a plurality of to-be-maintained locations, respectively. The method includes:
A) by the user device, generating a setup command, and transmitting the setup command to the server, the setup command indicating a selected location that is selected from among the to-be-maintained locations, a plurality of selected robots that are selected from among the autonomous robots, an available time slot, and a distribution mode signal;
B) determining, by the server based on the distribution mode signal, whether the operations of the selected robots are to be controlled based on the available time slot or an inputted priority section within the selected location;
C) in the case where the operations of the selected robots are to be controlled based on the available time slot, generating, by the server, a plurality of first sub-routes based on the selected location, associated information in the lookup table, a number of the selected robots, an expected movement speed of the autonomous robots, and a remaining time that is calculated based on the available time slot, a number of the first sub-routes equaling the number of the selected robots, and the first sub-routes being generated to be connected into an unbroken trail associated with one of the routes that is associated with the selected location;
after step C), transmitting the plurality of first sub-routes to the selected robots, respectively, so as to control each of the selected robots to move along the respective one of the first sub-routes;
D) in the case where the operations of the selected robots are to be controlled based on the inputted priority section, generating a plurality of second sub-routes based on the inputted priority section, the associated information in the lookup table, the number of the selected robots, the expected movement speed of the autonomous robots, and the remaining time, a number of the second sub-routes equaling the number of the selected robots, and the second sub-routes being generated to be connected into an unbroken trail associated with parts of the one of the routes that is associated with the selected location; and
after step D), transmitting the plurality of second sub-routes to the selected robots, respectively, so as to control each of the selected robots to move along the respective one of the second sub-routes.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Figure 1:
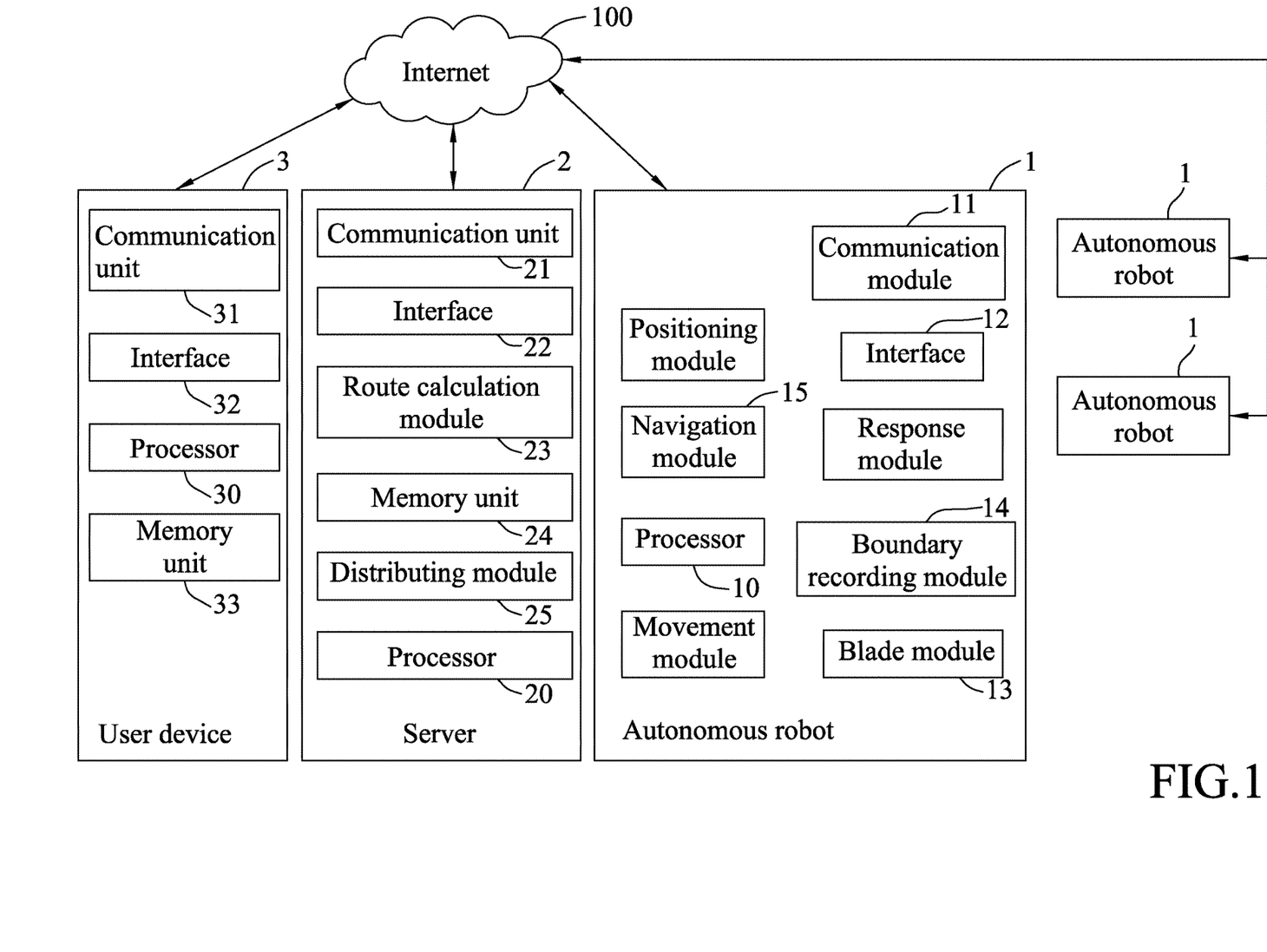
FIG. 1 is a block diagram illustrating a system according to one embodiment of the disclosure.

FIG. 1 is a block diagram illustrating a system according to one embodiment of the disclosure. The system includes a plurality of autonomous robots 1, a server 2 and a user device 3. The autonomous robots 1, the server 2 and the user device 3 may be connected to one another via a network such as the Internet 10, a local area network (LAN), etc. It is noted that while three autonomous robots 1 are present in FIG. 1, other numbers of autonomous robots 1 may be employed in other embodiments.

The user device 3 may be embodied using a mobile device such as a smart phone, a tablet, a laptop, etc., and includes a processor 30, a communication unit 31, an interface 32 and a memory unit 33.

The processor 30 may include, but not limited to, a single core processor, a multi-core processor, a dual-core mobile processor, a microprocessor, a microcontroller, a digital signal processor (DSP), a field-programmable gate array (FPGA), and/or an application specific integrated circuit (ASIC), etc.

The communication unit 31 may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or fifth generation (5G) of wireless mobile telecommunications technology, or the like.

The interface 32 may be embodied using a touchscreen, a keyboard, etc. The interface 32 enables a user to input a command.

The memory unit 33 may be embodied using, for example, random access memory (RAM), read only memory (ROM), programmable ROM (PROM), firmware, and/or flash memory, etc.

The server 2 includes a processor 20, a communication unit 21, an interface 22, a route calculation module 23, a memory unit 24, and a distributing module 25.

The processor 20, the communication unit 21, the interface 22 and the memory unit 24 may be embodied using components that are similar to the processor 30, the communication unit 31, the interface 32 and the memory unit 33, respectively. The route calculation module 23 and the distributing module 25 may be embodied using software instructions stored in the memory unit 24 or firmware that can be executed by the processor 20.

Each of the autonomous robots 1 includes a processor 10, a communication module 11, an interface 12, a memory unit 13, a boundary recording module 14, a navigation module 15, and a plurality of operation modules associated with the operation of the autonomous robot 1.

The processor 10, the communication unit 11, the interface 12 and the memory unit 13 may be embodied using components that are similar to the processor 30, the communication unit 31, the interface 32 and the memory unit 34, respectively. The boundary recording module 14 and the navigation module 15 may be embodied using software instructions stored in the memory unit 13 or firmware that can be executed by the processor 10.

It is noted that in this embodiment, each of the autonomous robots 1 is configured to perform automatic grass mowing, and the plurality of operation modules may include a positioning module, a movement module, a response module, a blade module, etc. Since the operations of autonomous robots performing automatic grass mowing are readily known in the related art, details thereof are omitted herein for the sake of brevity. In other embodiments, each of the autonomous robots 1 is configured to perform automatic floor cleaning.

In use, the system may be used for performing environment maintenance operations (i.e., grass mowing in this embodiment) at one or more to-be-maintained locations. For example, an owner of the system may be hired by a land owner to assist in mowing one or more lawns, and in response, the owner may deploy the system for performing the environment maintenance operations. It is noted that the blade module of each of the autonomous robots 1 is activated when the autonomous robot 1 is moving, such that the act of moving of the autonomous robots 1 at the to-be-maintained location may be considered as performing the environment maintenance operations.

Prior to the actual mowing, a boundary detecting process is first performed, so as to determine a boundary of each of the to-be-maintained location(s) (and therefore to determine a size of each of the to-be-maintained location(s)).

Specifically, one or more of the autonomous robots 1 may be placed at each of the to-be-maintained location(s), and the owner of the system may operate the interface 32 of the user device 3 to send a boundary detecting signal to the server 2 via the communication unit 31 and the Internet 10. In response to receipt of the boundary detecting signal via the communication unit 21, the server 2 is configured to control, with respect to each of the to-be-maintained location(s), the corresponding one or more of the autonomous robots 1 to start moving within the to-be-maintained location, in order to determine a boundary of the to-be-maintained location.

In response, the autonomous robot(s) 1 is(are) controlled to automatically move within the corresponding to-be-maintained location(s), so as to determine, with respect to each of the to-be-maintained location(s), a plurality of boundary points that constitute a boundary of the to-be-maintained location by using the boundary recording module 14. Then, the plurality of boundary points are transmitted back to the server 2 to be stored in the memory unit 24.

The route calculation module 23 is configured to calculate, with respect to each of the to-be-maintained location(s), a route based on the boundary defined by the plurality of boundary points. In use, the route may be represented using a sequence of route points that are linked together and that are to be passed through by the autonomous robot(s) 1. The resulting boundary and the route for each of the to-be-maintained location(s) may then be stored in the memory unit 24.

The following Table 1 lists an exemplary manner in which the boundary and the route for each of multiple to-be-maintained locations may be stored in the memory unit 24, and is in the form of a lookup table. That is to say, the lookup table includes information (i.e., the boundary and the route) associated with each of the to-be-maintained locations.

TABLE 1

| To-be-maintained location A1 | To-be-maintained location A2 | To-be-maintained location A3 |
|---|---|---|
| Boundary 1 Route 1 | Boundary 2 Route 2 | Boundary 3 Route 3 |

Figure 2:
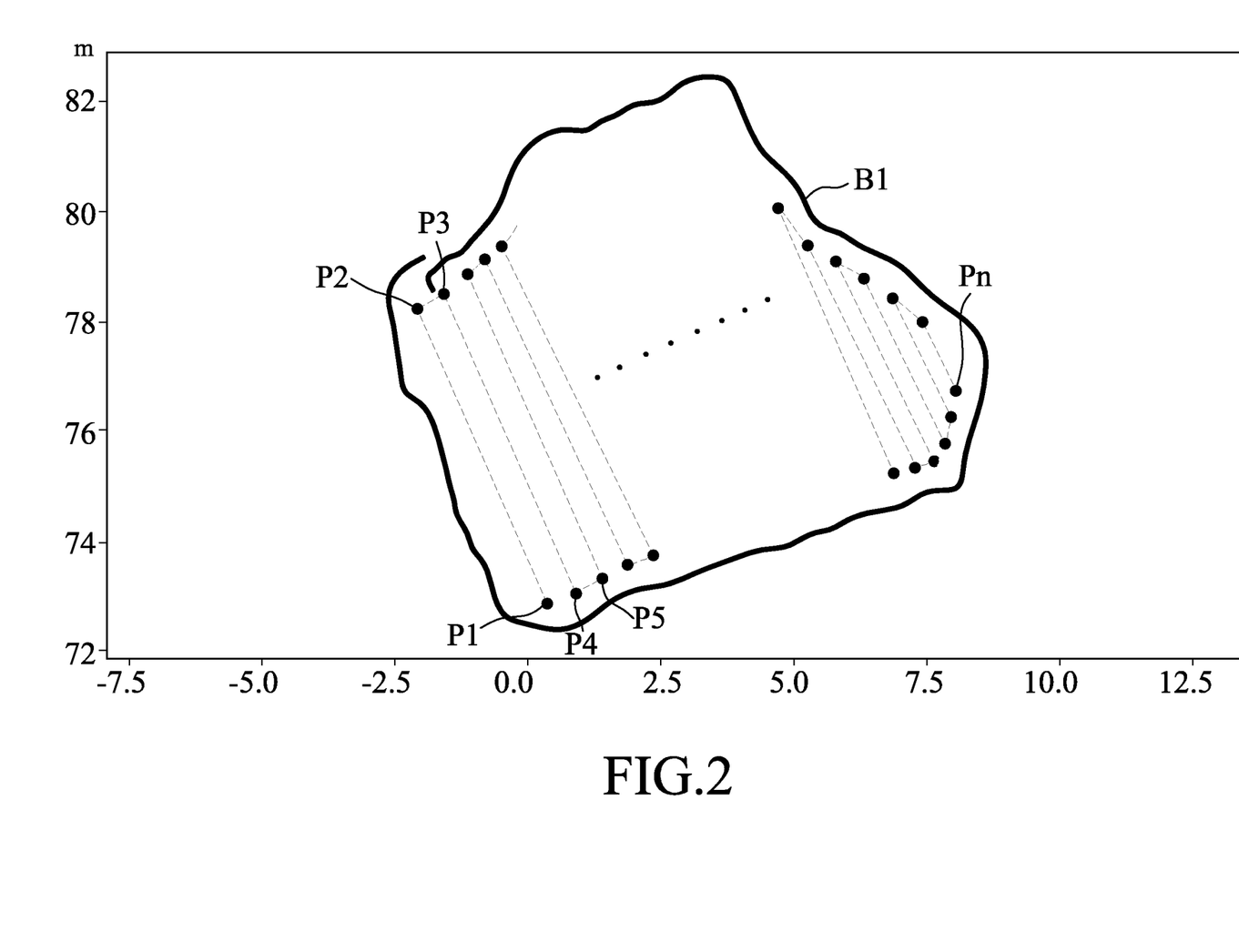
FIG. 2 illustrates an exemplary boundary of a to-be-maintained location detected by the autonomous robot(s), and an exemplary route that is indicated by a sequence of route points connected by dashed lines according to one embodiment of the disclosure.

FIG. 2 illustrates an exemplary boundary B1 of a to-be-maintained location detected by the autonomous robot(s) 1, and an exemplary route that is indicated by the sequence of route points (P1, P2, . . . , Pn) and the dashed lines linking up the route points according to one embodiment of the disclosure. In this embodiment, the boundary points and the sequence of route points are represented using coordinates of a Universal Transverse Mercator (UTM) projection system. It is worth noting that the route is defined by connecting the route points, and in use, the autonomous robot(s) 1 is(are) configured to move in straight lines from one of the route points to the next.

It is noted that the operations of an autonomous robot 1 moving to determine the boundary points, the generation of the boundary based on the boundary points, and the generation of the route points based on the boundary points so as to calculate the route constituted by the route points are readily known in the related art, so the details thereof are omitted herein for the sake of brevity.

Figure 3:
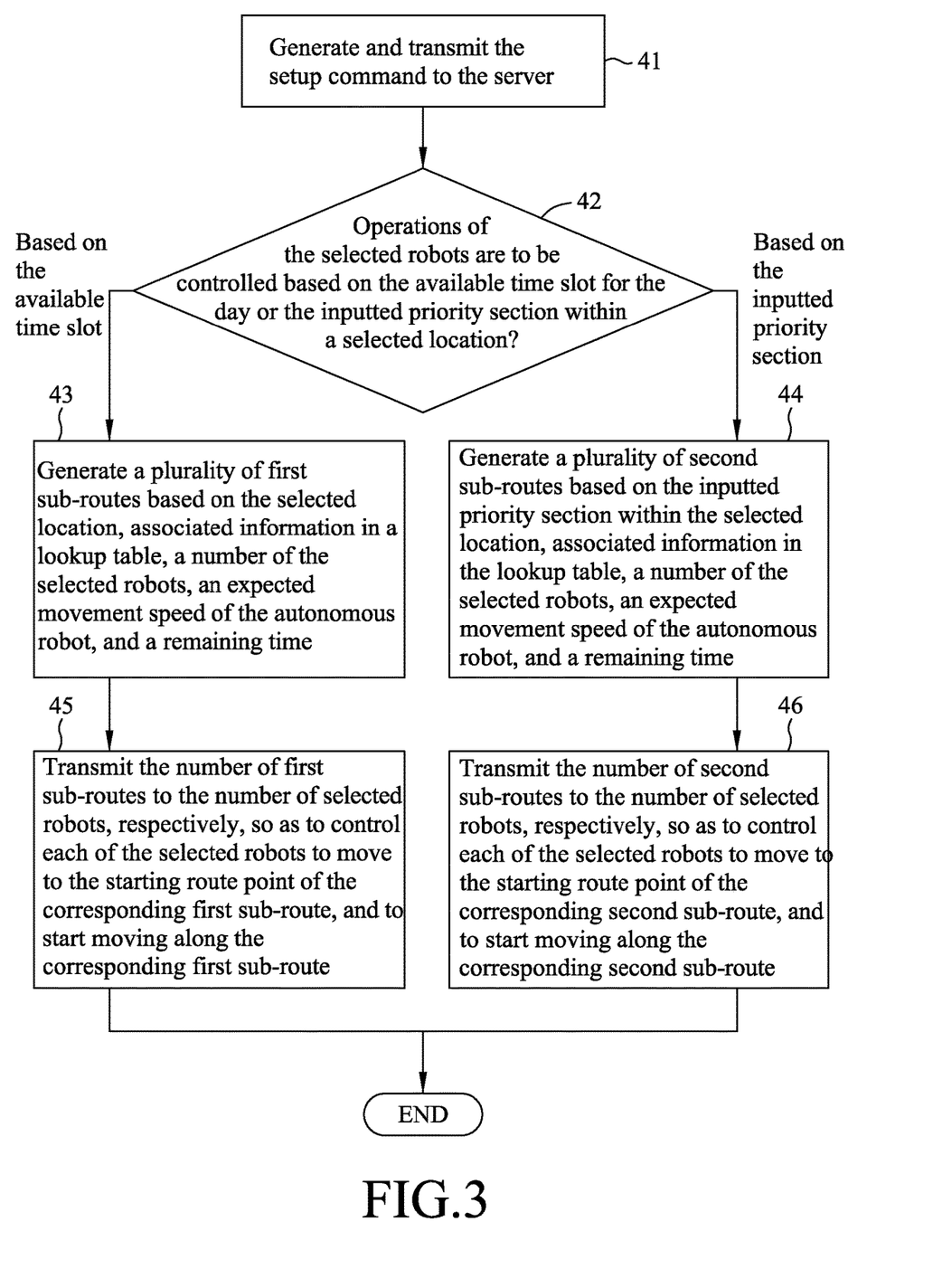
FIG. 3 is a flow chart illustrating steps of a method for controlling a plurality of autonomous robots for performing environment maintenance operations according to one embodiment of the disclosure.

FIG. 3 is a flow chart illustrating steps of a method for controlling a plurality of autonomous robots for performing environment maintenance operations according to one embodiment of the disclosure. In this embodiment, the method is implemented using the system of FIG. 1. The goal of the method is to control the plurality of autonomous robots to operate in coordination in a manner that the potential case where various parts of the to-be-maintained location that have not yet been maintained are distributed at random (i.e., not grouped together) would not occur after an available time slot on a given day (e.g., from 08:00 to 12:00) ends.

In step 41, the owner of the user device 3 operates the interface 32 to generate a setup command, and to transmit the setup command to the server 2. In this embodiment, the setup command indicates a selected location selected from among the to-be-maintained locations (which may be indicated by one of the numbers A1 to A3 in Table 1), a plurality of selected robots that are selected from among the autonomous robots 1, an available time slot for the day (e.g., 08:00-12:00), and a distribution mode signal. It is noted that in some embodiments, the owner of the user device 3 may operate the interface 22 of the server 2 to generate the setup command directly.

The distribution mode signal indicates whether the operations of the selected robots are to be controlled based on the available time slot for the day or based on an inputted priority section within the selected location (the priority section is a section enclosed by a smaller boundary within the boundary of the selected location). That is to say, an area of the inputted priority section is smaller than an area of the selected location. In this embodiment, when the owner decides that the operations of the selected robots are to be controlled based on the priority section, he/she may further input the priority section (e.g., by inputting a boundary of the priority section) that is then incorporated into the distribution mode signal. In this embodiment, the distribution mode signal may include a one-bit binary signal (one of the two logic levels 0 and 1) to indicate one of the two types of operations. Also, in the case where an inputted priority section is received, the route calculation module 23 then calculates, with respect to the inputted priority section, a priority route based on the boundary of the inputted priority section. The priority route may also include a number of route points, and may be stored in the lookup table.

In response to receipt of the setup command, in step 42, the distributing module 25 of the server 2 determines, based on the distribution mode signal, whether the operations of the selected robots are to be controlled based on the available time slot for the day or the inputted priority section within the selected location. In the case where the distribution mode signal indicates that the operations of the selected robots are to be controlled based on the available time slot for the day, the flow proceeds to step 43. Otherwise, in the case where the distribution mode signal indicates that the operations of the autonomous robots 1 are to be controlled based on the priority section, the flow proceeds to step 44.

In step 43, the distributing module 25 of the server 2 generates a plurality of first sub-routes based on the selected location, the associated information in the lookup table (e.g., the above Table 1), a number (quantity) of the selected robots, an expected movement speed of the autonomous robots 1, and a remaining time (e.g., 4 hours) that is calculated based on the available time slot for the day. It is noted that a number of the first sub-routes equals the number of the selected robots (denoted by a number N). The first sub-routes are generated to be connected into an unbroken trail that is associated with the corresponding route generated for the selected location.

Figure 4:
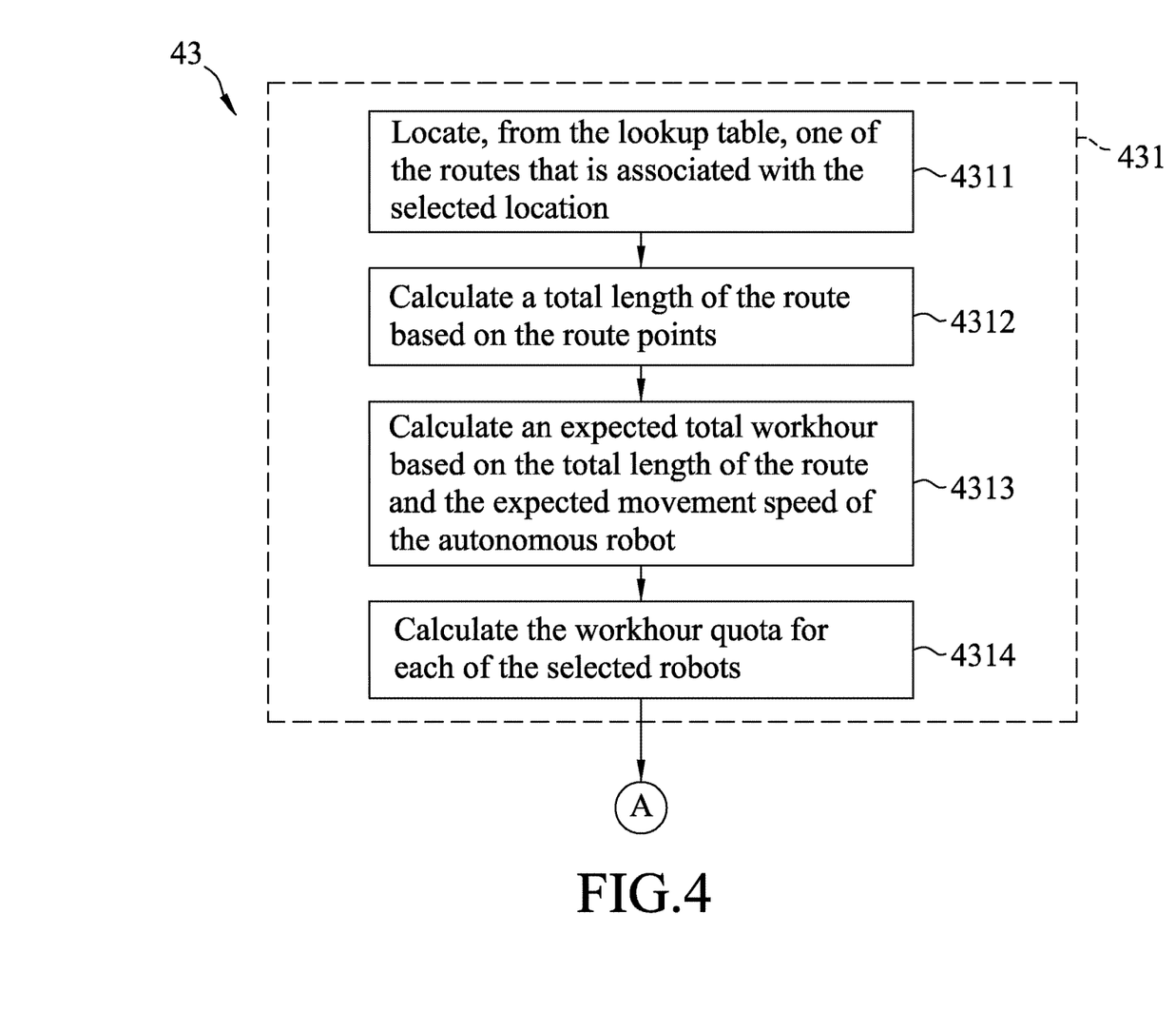
FIGS. 4 and 5 cooperatively illustrate a flow chart illustrating the sub-steps of the operations of generating a plurality of first sub-routes for a plurality of selected robots according to one embodiment of the disclosure.
Figure 5:
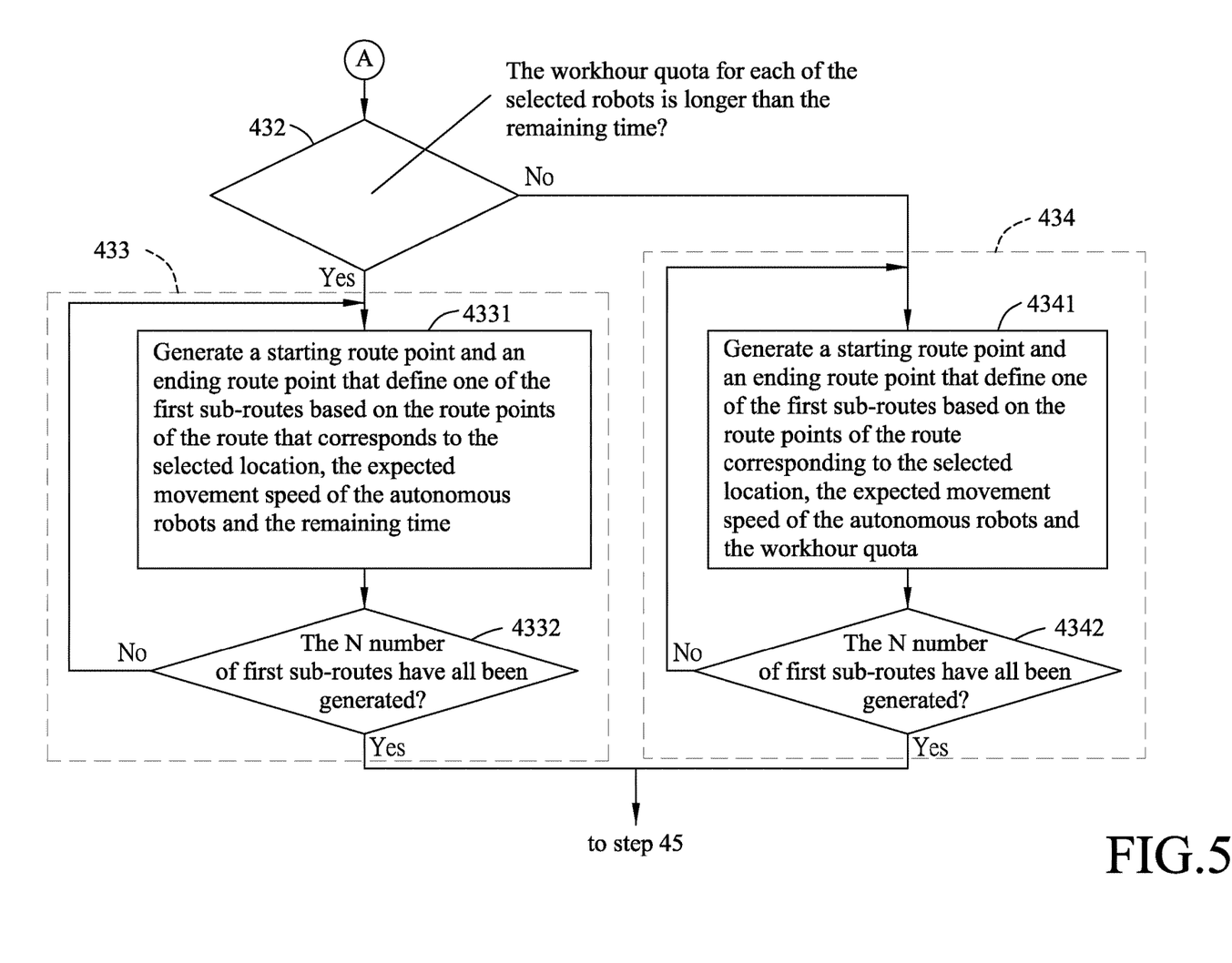

Specifically, FIGS. 4 and 5 cooperatively illustrate a flow chart illustrating the sub-steps of the operations of step 43.

In sub-step 431, the distributing module 25 is configured to determine, for each of the N selected robots, a workhour quota based on the selected location, the associated information in the lookup table (e.g., the above Table 1), the number of the selected robots, and the expected movement speed of the autonomous robots 1. It is noted that for the simplicity of description, each of the autonomous robots 1 is considered to have the same expected movement speed (e.g., 60 centimeters per second). FIG. 4 also illustrates the sub-steps of the operations of sub-step 431.

In sub-step 4311, the distributing module 25 locates, from the lookup table, one of the routes that is associated with the selected location. For example, when the to-be-maintained location A2 is the selected location, the second route is located in sub-step 4311. Specifically, the route points of the second route are obtained.

In sub-step 4312, the distributing module 25 calculates a total length of the route based on the route points.

In sub-step 4313, the distributing module 25 calculates an expected total workhour based on the total length of the route and the expected movement speed of the autonomous robots 1. Specifically, the expected total workhour may be calculated by dividing the total length of the route by the expected movement speed of the autonomous robots 1.

In sub-step 4314, the distributing module 25 calculates the workhour quota for each of the selected robots. Specifically, the workhour quota for each of the selected robots may be calculated by dividing the expected total workhour by the number of the selected robots.

Then, in sub-step 432 (see FIG. 5), the distributing module 25 determines whether the workhour quota for each of the selected robots is longer than the remaining time. In the case where the workhour quota for each of the selected robots is longer than the remaining time (that is, the maintenance operations to be carried out on the selected location cannot be fully completed within the remaining time), the flow proceeds to sub-step 433. In the case where the workhour quota for each of the selected robots is not longer than the remaining time, the flow proceeds to sub-step 434. FIG. 5 also illustrates the sub-steps of the operations of sub-step 433 and sub-step 434.

In sub-step 433, the distributing module 25 generates the plurality of first sub-routes based on the selected location, the expected movement speed of the autonomous robots 1, the number of the selected robots, and the remaining time.

Specifically, in sub-step 4331, based on the route points of the route that corresponds to the selected location, the expected movement speed of the autonomous robots 1 and the remaining time, the distributing module 25 generates a starting route point and an ending route point that define one of the first sub-routes. That is to say, in this sub-step, the distributing module 25 generates one of the N first sub-routes for one of the selected robots.

Then, in sub-step 4332, the distributing module 25 determines whether the N number of first sub-routes have all been generated. In the case where the N number of first sub-routes have all been generated, the flow proceeds to step 45. In the case where the N number of first sub-routes have not all been generated, the flow goes back to sub-step 4331 to generate another first sub-route until the N number of first sub-routes have all been generated.

In one example, the number N equals 3, and the route includes 30 sequentially arranged route points, which will be referred to as route points wp1 to wp30. The remaining time may be, for example, 4 hours.

In sub-step 4331, the distributing module 25 calculates a distance between a particular pair of two different route points, and determines whether a resulting first sub-route can be covered by an autonomous robot 1 within the remaining time (i.e., whether the distance divided by the expected movement speed is smaller than the remaining time). When it is determined that the distance between the particular pair of two different route points can be covered by an autonomous robot 1 in less than the remaining time (4 hours), the distributing module 25 calculates a distance between a next pair of two different route points, and this process is reiterated until it is determined that the distance between a newest pair of two different route points cannot be covered by an autonomous robot 1 within the remaining time. Then, a previous pair of two different route points that is immediately prior to the newest pair is selected, with the two different route points in the previous pair serving as the starting route point and the ending route point that define one of the first sub-routes. That is to say, each of the first sub-routes is generated to have a length (the greatest length in this embodiment) that can be covered by one of the selected robots, moving at the expected movement speed, within the remaining time.

For example, in the first iteration of sub-step 4331 performed to determine a first one of the first sub-routes, in an $i^{th}$ iteration of the distance calculation, where i is a positive integer, the distributing module 25 calculates a distance between the route points wp1 and wp6, and determines that the distance between the route points wp1 and wp6 can be covered by an autonomous robot 1 in, for example, 3 hours, 20 minutes, which is within the remaining time. Then, in an $(i+1)^{th}$ iteration of the distance calculation, the distributing module 25 calculates a distance between the route points wp1 and wp7, and determines that the distance between the route points wp1 and wp7 can be covered by an autonomous robot 1 in, for example, 3 hours, 50 minutes, which is within the remaining time. Then, in an $(i+2)^{th}$ iteration of the distance calculation, the distributing module 25 calculates a distance between the route points wp1 and wp8, and determines that an autonomous robot 1 needs to spend 4 hours, 15 minutes to cover such distance between the route points wp1 and wp8, i.e., such distance cannot be covered by an autonomous robot 1 within the remaining time. As such, the distributing module 25 selects the route points wp1 and wp7 as the starting route point and the ending route point that define the first one of the first sub-routes. Then, in sub-step 4332, the distributing module 25 determines that only one of the three first sub-routes has been generated (two more first sub-routes are needed), and the flow goes back to sub-step 4331.

It is noted that after generating the first one of the first sub-routes, when generating the subsequent first sub-routes, the ending route point of one of the first sub-routes is designated to be the starting route point of a next one of the first sub-routes. For example, the starting route point of the second one of the first sub-routes in this case will be wp7 (the ending route point of the first one of the first sub-routes), and the starting route point of the third one of the first sub-routes in this case will be the ending route point of the second one of the first sub-routes. As such, the first sub-routes can be connected to form an unbroken trail.

In a second iteration of sub-step 4331 performed to determine a second one of the first sub-routes, the distributing module 25 determines that a distance between the route points wp7 to wp11 can be covered by an autonomous robot 1 in, for example, 3 hours, 30 minutes, which is within the remaining time, then determines that a distance between the route points wp7 and wp12 can be covered by an autonomous robot 1 in, for example, 3 hours, 55 minutes, which is within the remaining time, and then determines that a distance between the route points wp7 and wp13 cannot be covered by the autonomous robot 1 within the remaining time (e.g., 4 hours, 25 minutes is needed). As such, the distributing module 25 selects the route points wp7 and wp12 as the starting route point and the ending route point that define the second one of the first sub-routes. Then, in sub-step 4332, the distributing module 25 determines that only two of the three first sub-routes have been generated, and the flow goes back to sub-step 4331 for a third iteration. Similarly, the third iteration of sub-step 4331 may result in distributing module 25 selecting the route points wp12 and wp20 as the starting route point and the ending route point that define a third one of the first sub-routes. Then, in sub-step 4332, the distributing module 25 determines that three first sub-routes are generated, and the flow proceeds to step 45.

It is noted that in this manner, since the maintenance operations on the entirety of the selected location cannot be completed within the remaining time, the first sub-routes are generated in such a manner that the largest possible portion of the selected location can be covered (i.e., maintained) by the plurality of selected robots, while the parts of the selected location that will have been maintained respectively by the selected robots are connected together at the end of the day.

On the other hand, in sub-step 434, the distributing module 25 generates the plurality of first sub-routes based on the selected location, the expected movement speed of the autonomous robots 1, the number of the selected robots, and the workhour quota.

Specifically, in sub-step 4341, based on the route points of the route corresponding to the selected location, the expected movement speed of the autonomous robots 1 and the workhour quota, the distributing module 25 generates a starting route point and an ending route point that define one of the first sub-routes. That is to say, in this sub-step, the distributing module 25 generates one of the N first sub-routes for one of the selected robots.

Then, in sub-step 4342, the distributing module 25 determines whether the N number of first sub-routes have all been generated. In the case where the N number of first sub-routes have all been generated, the flow proceeds to step 45. In the case where the N number of first sub-routes have not all been generated, the flow goes back to sub-step 4341 to generate another first sub-route until the N number of first sub-routes have all been generated. It is noted that in this embodiment, the operations of sub-step 4341 and sub-step 4342 are similar to those of sub-step 4331 and sub-step 4332, respectively. That is to say, in sub-step 4341, the distributing module 25 calculates a distance between a particular pair of two different route points, and determines whether a resulting first sub-route can be covered by an autonomous robot 1 within the workhour quota (e.g., 3 hours), that is to say, whether the distance divided by the expected movement speed is smaller than the workhour quota. When it is determined that the distance between the particular pair of two different route points can be covered by an autonomous robot 1 in less than the workhour quota, the distributing module 25 calculates a distance between a next pair of two different route points, and this process is reiterated until it is determined that the distance between a newest pair of two different route points cannot be covered by an autonomous robot 1 within the workhour quota. Then, a previous pair of two different route points that is immediately prior to the newest pair is selected, with the two different route points in the previous pair serving as the starting route point and the ending route point that define one of the first sub-routes. Each of the first sub-routes is generated to have a length (the greatest length in this embodiment) that can be covered by one of the selected robots, moving at the expected movement speed, within the workhour quota. After generating a first one of the first sub-routes, when generating the subsequent first sub-routes, the ending route point of one of the first sub-routes is designated to be the starting route point of a next one of the first sub-routes. It is noted that in this case, a last one of the first sub-routes may end up with a distance that is significantly shorter than the distances of other first sub-routes, since the entirety of the selected location can be covered (i.e., maintained) by the plurality of selected robots within the workhour quota.

The above processes describe the operations for generating the first sub-routes in the case where the selected robots are to be controlled based on the available time slot for the day.

Figure 6:
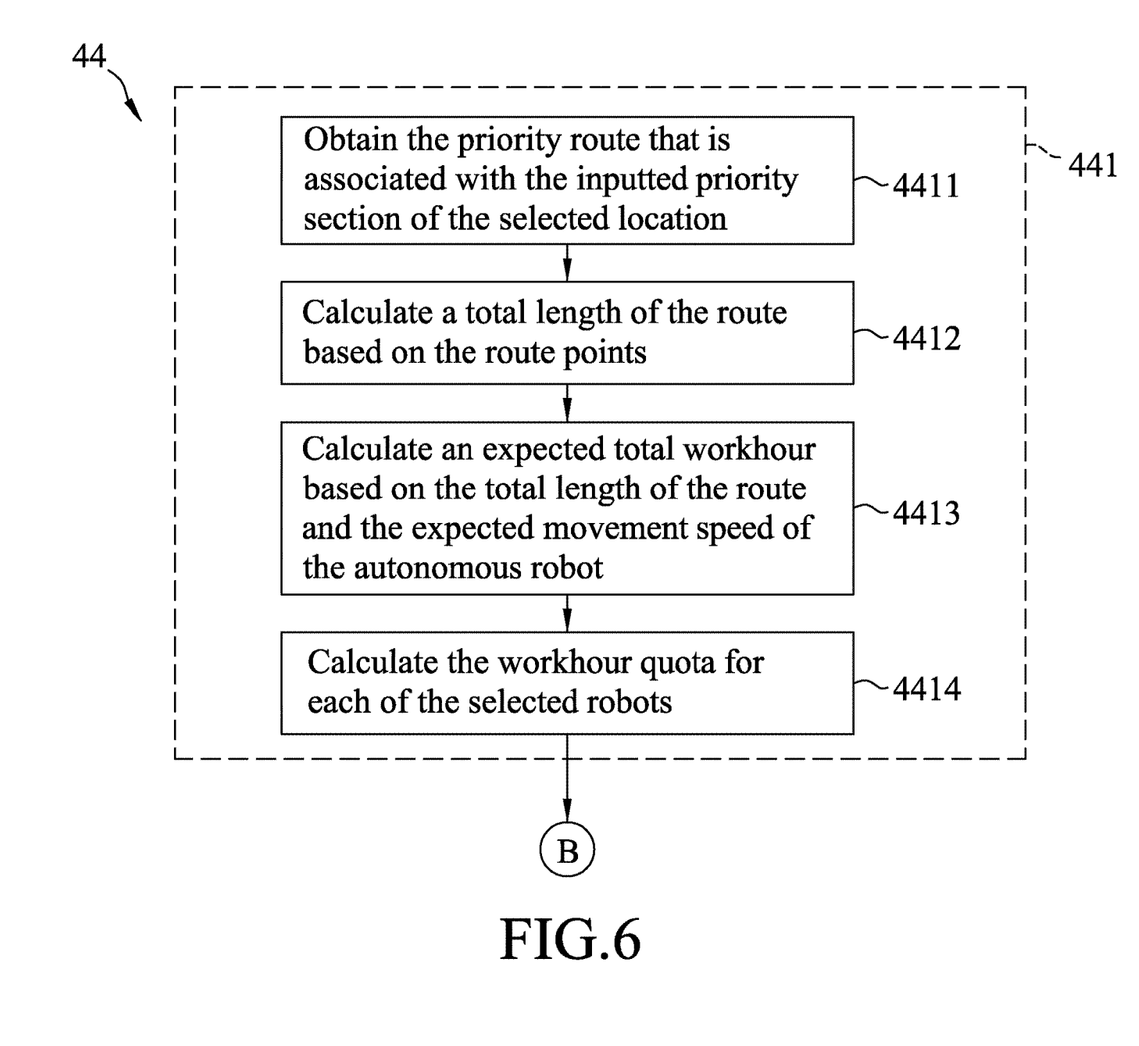
FIGS. 6 and 7 cooperatively illustrate a flow chart illustrating the sub-steps of the operations of generating a plurality of second sub-routes for the plurality of selected robots according to one embodiment of the disclosure.
Figure 7:
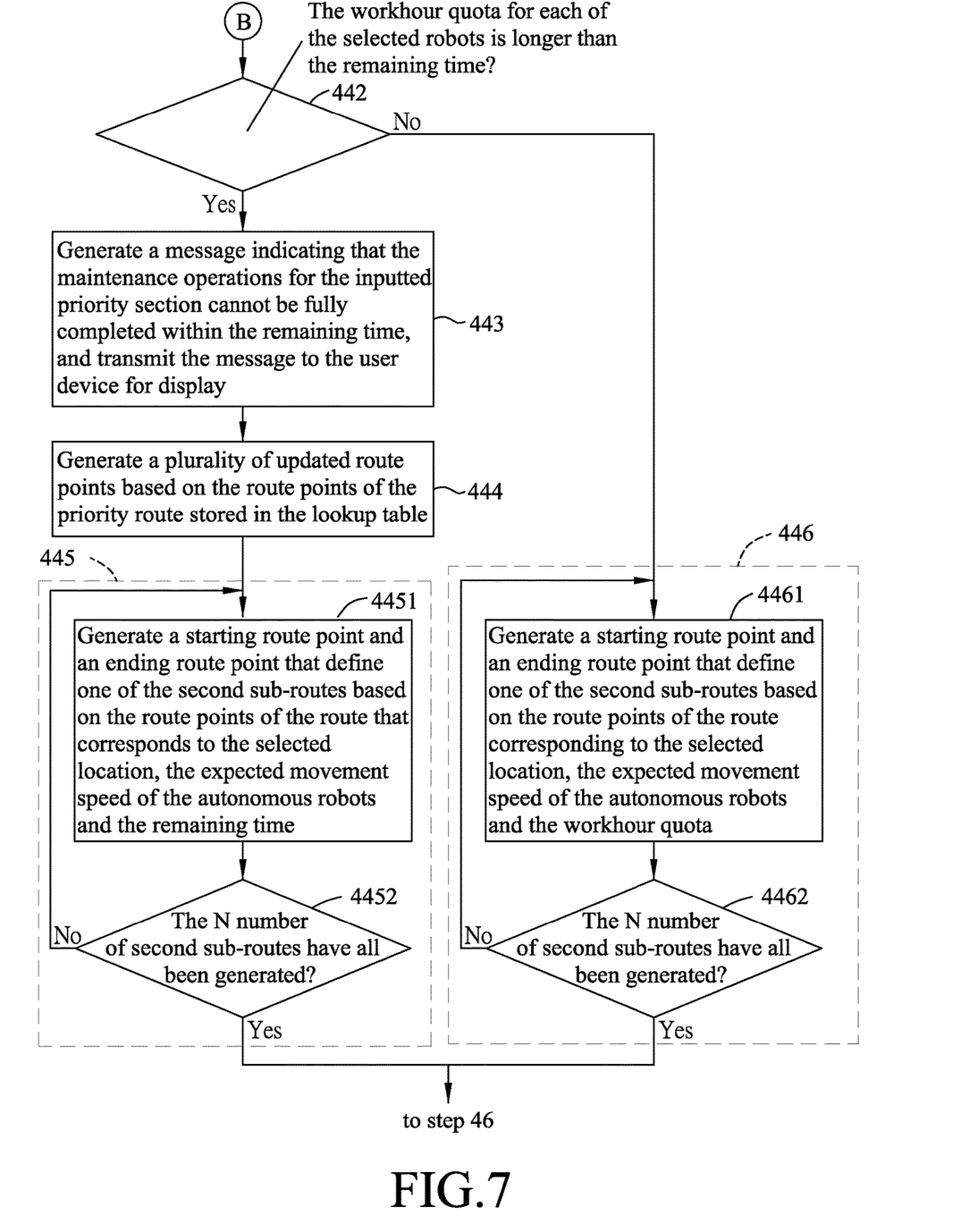

On the other hand, FIGS. 6 and 7 cooperatively illustrate a flow chart illustrating the sub-steps of the operations of step 44, which is performed after it is decided that the selected robots are to be controlled based on the inputted priority section within the selected location.

In step 44, the distributing module 25 of the server 2 generates a plurality of second sub-routes based on the inputted priority section within the selected location, the associated information in the lookup table (e.g., the above Table 1), a number (quantity) of the selected robots, an expected movement speed of the autonomous robots 1, and a remaining time that is calculated based on the available time slot for the day. It is noted that a number of the second sub-routes equals the number of the selected robots (denoted by a number N). The second sub-routes thus generated can be connected into an unbroken trail that is associated with a part of the corresponding route generated for the selected location, or associated with the priority route which is generated based on the boundary of the inputted priority section by the route calculation module 23 (in this embodiment, for the sake of description, the priority route is generated and employed).

In sub-step 441, the distributing module 25 determines, for each of the N selected robots, a workhour quota based on the inputted priority section, the associated information in the lookup table (e.g., the above Table 1), the number of the selected robots, and the expected movement speed of the autonomous robots 1. It is noted that for the simplicity of description, each of the autonomous robots 1 is presumed to have the same expected movement speed (e.g., 60 centimeters per second). FIG. 6 illustrates the sub-steps of the operations of sub-step 441.

In sub-step 4411, the distributing module 25 locates, from the lookup table, the priority route that is associated with the inputted priority section of the selected location. Specifically, the route points of the priority route are obtained. It is noted that in other embodiments, the priority route may not be stored, and the route calculation module 23 may determine the route points that constitute the priority route at this stage, and store the route points of the priority route in the lookup table.

In sub-step 4412, the distributing module 25 calculates a total length of the priority route based on the route points.

In sub-step 4413, the distributing module 25 calculates an expected total workhour based on the total length of the priority route and the expected movement speed of the autonomous robots 1. Specifically, the expected total workhour may be calculated by dividing the total length of the priority route by the expected movement speed of the autonomous robots 1.

In sub-step 4414, the distributing module 25 calculates the workhour quota for each of the selected robots. Specifically, the workhour quota for each of the selected robots may be calculated by dividing the expected total workhour by the number of the selected robots.

FIG. 7 illustrates the operations of sub-steps 442 to sub-step 446.

In sub-step 442, the distributing module 25 determines whether the workhour quota for each of the selected robots is longer than the remaining time. In the case where the workhour quota for each of the selected robots is longer than the remaining time (that is, the maintenance operations on the inputted priority section cannot be fully completed within the remaining time), the flow proceeds to sub-step 443. In the case where the workhour quota for each of the selected robots is not longer than the remaining time, the flow proceeds to sub-step 446.

In sub-step 443, the distributing module 25 generates a message indicating that the maintenance operations for the inputted priority section cannot be fully completed within the remaining time, and transmits the message to the user device 3 for display of the message on the user device 3.

In sub-step 444, the distributing module 25 generates a plurality of updated route points based on the route points of the priority route stored in the lookup table. This step may be implemented by the distributing module 25 selecting some of the route points that constitute the priority route to serve as the updated route points, or the updated route points may be generated in response to receipt of another inputted priority section (which is smaller than the previous inputted priority section) from the user device 3. Afterward, an updated route is generated by connecting the update route points.

In sub-step 445, the distributing module 25 generates the plurality of second sub-routes based on the plurality of updated route points, the expected movement speed of the autonomous robot 1, the number of the selected robots, and the remaining time.

Specifically, in sub-step 4451, based on the updated route points of the updated route, the expected movement speed of the autonomous robots 1 and the remaining time, the distributing module 25 generates a starting route point and an ending route point that define one of the second sub-routes. That is to say, in this sub-step, the distributing module 25 generates one of the N second sub-routes for one of the selected robots.

Then, in sub-step 4452, the distributing module 25 determines whether the N number of second sub-routes have all been generated. In the case where the N number of second sub-routes have all been generated, the flow proceeds to step 46. In the case where the N number of second sub-routes have not all been generated, the flow goes back to sub-step 4451 to generate another second sub-route until the N number of second sub-routes have all been generated. It is noted that in this embodiment, the operations of sub-step 4451 and sub-step 4452 are similar to those of sub-step 4331 and sub-step 4332, respectively. That is to say, in the example where N=3, three iterations of sub-step 4451 will be implemented to generate the three second sub-routes. Also, the N number of second sub-routes generated can be connected to form an unbroken trail. Each of the second sub-routes is generated to have a length (the greatest length in this embodiment) that can be covered by one of the selected robots, moving at the expected movement speed, within the remaining time. After generating a first one of the second sub-routes, when generating the subsequent second sub-routes, the ending route point of one of the second sub-routes is designated to be the starting route point of a next one of the second sub-routes.

It is noted that in this manner, since the maintenance operations on the inputted priority section cannot be fully completed within the remaining time, the second sub-routes are generated such that a largest possible portion of the inputted priority section can be covered (i.e., maintained) by the plurality of selected robots, while the parts of the inputted priority section that will have been maintained respectively by the selected robots are connected together at the end of the day.

In sub-step 446, the distributing module 25 generates the plurality of second sub-routes based on the route points of the priority route, the expected movement speed of the autonomous robots 1, the number of the selected robots, and the workhour quota.

Specifically, in sub-step 4461, based on the route points of the priority route, the expected movement speed of the autonomous robots 1 and the workhour quota, the distributing module 25 generates a starting route point and an ending route point that define one of the second sub-routes. That is to say, in this sub-step, the distributing module 25 generates one of the N second sub-routes for one of the selected robots.

Then, in sub-step 4462, the distributing module 25 determines whether the N number of second sub-routes have all been generated. In the case where the N number of second sub-routes have all been generated, the flow proceeds to step 46. In the case where the N number of second sub-routes have not all been generated, the flow goes back to sub-step 4461 to generate another second sub-route until the N number of second sub-routes have all been generated.

It is noted that in this embodiment, the operations of sub-step 4461 and sub-step 4462 are similar to those of sub-step 4341 and sub-step 4342, respectively. That is to say, in the example where N=3, three iterations of sub-step 4461 will be implemented to generate the three second sub-routes. Also, the N number of second sub-routes generated can be connected to form an unbroken trail. Each of the second sub-routes is generated to have a greatest length that can be covered by one of the selected robots, moving at the expected movement speed, within the workhour quota. After generating a first one of the second sub-routes, when generating the subsequent second sub-routes, the ending route point of one of the second sub-routes is designated to be the starting route point of a next one of the second sub-routes. It is noted that in this case, a last one of the second sub-routes may end up with a distance that is significantly shorter than the distances of other second sub-routes, since the entirety of the inputted priority section can be covered (i.e., maintained) by the plurality of selected robots within the workhour quota.

In step 45, the distributing module 25 transmits the N number of first sub-routes to the N number of selected robots, respectively, so as to control each of the selected robots to, by using the navigation module 15, move to the starting route point of the corresponding first sub-route, and to start moving along the corresponding first sub-route. As such, the N number of selected robots are controlled to cooperatively perform the maintenance operation on the selected location.

In step 46, the distributing module 25 transmits the N number of second sub-routes to the N number of selected robots, respectively, so as to control each of the selected robots to, by using the navigation module 15, move to the starting route point of the corresponding second sub-route, and to start moving along the corresponding second sub-route. As such, the N number of selected robots are controlled to cooperatively perform the maintenance operation on the inputted priority section.

In some embodiments, steps 43 and 44 may be implemented with respect to a plurality of to-be-maintained locations and a plurality of inputted priority sections that are separate from one another, such that in steps 45 and 46, the selected robots disposed at different to-be-maintained locations and different inputted priority sections may be controlled to perform respective maintenance tasks at the same time.

To sum up, the embodiments of the disclosure provide a method for controlling a plurality of autonomous robots for environment maintenance. In the method, a route for a to-be-maintained location is generated, and based on a preference of a customer, the maintenance operations may be performed by the autonomous robots based on an available time slot or an inputted priority section.

In the case where the autonomous robots are to be controlled based on the available time slot, a plurality of first sub-routes are generated based on route points of a generated route that corresponds to the to-be-maintained location, a number (quantity) of available autonomous robots, an expected movement speed of the autonomous robots, and a remaining time. When it is determined that the entirety of the to-be-maintained location cannot be covered by the available autonomous robots within the remaining time, the plurality of first sub-routes are generated to satisfy the condition that the first sub-routes can be connected to form an unbroken trail, such that the parts of the to-be-maintained location that will have been maintained after the remaining time has elapsed can be connected together instead of being scattered all over the to-be-maintained location, while ensuring that a largest possible part of to-be-maintained location will be covered by the available autonomous robots.

In the case where the autonomous robots are to be controlled based on an inputted priority section, a plurality of second sub-routes are generated based on route points of a priority route that is generated based on the inputted priority section, a number (quantity) of available autonomous robots, an expected movement speed of the autonomous robots, and a remaining time. When it is determined that the entirety of the inputted priority section cannot be covered within the remaining time, a message indicating that maintenance of the inputted priority section cannot be fully completed within the remaining time is generated and transmitted to notify a customer. Then, the plurality of second sub-routes are generated to satisfy the condition that the second sub-routes can be connected to form an unbroken trail, such that the parts of the inputted priority section that will have been maintained after the remaining time has elapsed can be connected instead of being scattered all over the inputted priority section, while ensuring that a largest possible part of the inputted priority section will be covered by the available autonomous robots.

It is noted that using such a configuration, after the remaining time has elapsed, the maintenance operations for the remaining parts of the to-be-maintained location or the inputted priority section may be continued on the next day, and since the parts of the to-be-maintained location/inputted priority section that have been maintained upon expiration of the remaining time are connected instead of being scattered, the maintenance operations for the remaining parts can also be performed relatively easily.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for controlling a plurality of autonomous robots for performing environment maintenance operations, the method being implemented using a system that includes the plurality of autonomous robots, a user device, and a server that stores a lookup table therein and that is coupled to each of the plurality of autonomous robots and the user device, the lookup table including a plurality of routes associated with a plurality of to-be-maintained locations, respectively, the method comprising:

A) by the user device, generating a setup command, and transmitting the setup command to the server, the setup command indicating a selected location that is selected from among the to-be-maintained locations, a plurality of selected robots that are selected from among the autonomous robots, an available time slot, and a distribution mode signal, the distribution mode signal indicating whether the operations of the selected robots are to be controlled based on the available time slot or an inputted priority section within the selected location, an area of the inputted priority section being smaller than an area of the selected location;

B) determining, by the server based on the distribution mode signal, whether the operations of the selected robots are to be controlled based on the available time slot or an inputted priority section within the selected location;

C) in the case where the operations of the selected robots are to be controlled based on the available time slot, generating, by the server, a plurality of first sub-routes based on the selected location, associated information in the lookup table, a number of the selected robots, an expected movement speed of the autonomous robots, and a remaining time that is calculated based on the available time slot, a number of the first sub-routes equaling the number of the selected robots, and the first sub-routes being generated to be connected into an unbroken trail associated with one of the routes that is associated with the selected location;

after step C), transmitting the plurality of first sub-routes to the selected robots, respectively, so as to control each of the selected robots to move along the respective one of the first sub-routes;

D) in the case where the operations of the selected robots are to be controlled based on the inputted priority section, generating a plurality of second sub-routes based on the inputted priority section, the associated information in the lookup table, the number of the selected robots, the expected movement speed of the autonomous robots, and the remaining time, a number of the second sub-routes equaling the number of the selected robots, and the second sub-routes being generated to be connected into an unbroken trail associated with parts of the one of the routes that is associated with the selected location; and after step D), transmitting the plurality of second sub-routes to the selected robots, respectively, so as to control each of the selected robots to move along the respective one of the second sub-routes.

2. The method as claimed in claim 1, wherein step C) includes:

C1) determining, for each of the selected robots, a workhour quota based on the selected location, the associated information in the lookup table, the number of the selected robots, and the expected movement speed of the autonomous robots;

C2) determining whether the workhour quota for each of the selected robots is longer than the remaining time;

C3) in the case where the workhour quota is longer than the remaining time, generating the plurality of first sub-routes based on the selected location, the expected movement speed of the autonomous robots, the number of the selected robots, and the remaining time; and C4) in the case where the workhour quota is not longer than the remaining time, generating the plurality of first sub-routes based on the selected location, the expected movement speed of the autonomous robots, the number of the selected robots, and the workhour quota.

3. The method as claimed in claim 2, each of the routes including a plurality of route points, wherein sub-step C1) includes:

C11) locating one of the routes stored in the lookup table that is associated with the selected location;

C12) calculating a total length of the route based on the route points of the route;

C13) calculate an expected total workhour based on the total length of the route and the expected movement speed of the autonomous robots; and C14) calculate the workhour quota for each of the selected robots by dividing the expected total workhour by the number of the selected robots.

4. The method as claimed in claim 2, each of the routes including a plurality of route points, wherein sub-step C3) includes:

C31) based on the route points of one of the route that is associated with the selected location, the expected movement speed of the autonomous robots and the remaining time, generating a starting route point and an ending route point that define one of the first sub-routes;

C32) repeating sub-step C31) until the plurality of first sub-routes have all been generated, wherein each of the first sub-routes is generated to have a length that can be covered by one of the selected robots, moving at the expected movement speed, within the remaining time, and after generating a first one of the first sub-routes, when generating subsequent ones of the first sub-routes, the ending route point of one of the first sub-routes is designated to be the starting route point of a next one of the first sub-routes.

5. The method as claimed in claim 2, each of the routes including a plurality of route points, wherein sub-step C4) includes:

C41) based on the route points of one of the routes that is associated with the selected location, the expected movement speed of the autonomous robot, and the workhour quota, generating a starting route point and an ending route point that define one of the first sub-routes;

C42) repeating sub-step C41) until the plurality of first sub-routes have all been generated, wherein each of the first sub-routes is generated to have a length that can be covered by one of the selected robots, moving at the expected movement speed, within the workhour quota, and after generating a first one of the first sub-routes, when generating subsequent ones of the first sub-routes, the ending route point of one of the first sub-routes is designated to be the starting route point of a next one of the first sub-routes.

6. The method as claimed in claim 1, each of the routes including a plurality of route points, wherein step D) includes:

D1) determining, for each of the selected robots, a workhour quota based on a priority route associated with the inputted priority section, the associated information in the lookup table, the number of the selected robots, and the expected movement speed of the autonomous robots, where the priority route includes a plurality of route points;

D2) determining whether the workhour quota for each of the selected robots is longer than the remaining time;

D3) in the case where the workhour quota for each of the selected robots is longer than the remaining time, generating a plurality of updated route points based on the route points of the priority route, D4) after sub-step D3), generating the plurality of second sub-routes based on the plurality of updated route points, the expected movement speed of the autonomous robots, the number of the selected robots, and the remaining time, wherein each of the second sub-routes is generated to have a length that can be covered by one of the selected robots, moving at the expected movement speed, within the remaining time; and D5) in the case where the workhour quota for each of the selected robots is longer than the remaining time, generating the plurality of second sub-routes based on the route points of the priority route, the expected movement speed of the autonomous robots, the number of the selected robots, and the workhour quota, wherein each of the second sub-routes is generated to have a length that can be covered by one of the selected robots, moving at the expected movement speed, within the workhour quota.

7. The method as claimed in claim 6, wherein sub-step D1) includes:

D11) determining the route points of the priority route associated with the inputted priority section within the selected location;

D12) calculating a total length of the priority route based on the route points of the priority route;

D13) calculating an expected total workhour based on the total length of the priority route and the expected movement speed of the autonomous robots; and D14) calculate the workhour quota for each of the selected robots by dividing the expected total workhour by the number of the selected robots.

8. The method as claimed in claim 6, wherein sub-step D4) includes:

D41) based on the updated route points, the expected movement speed of the autonomous robots and the remaining time, generating a starting route point and an ending route point that define one of the second sub-routes; and D42) repeating sub-step D41) until the plurality of second sub-routes have all been generated, wherein each of the second sub-routes is generated to have a length that can be covered by one of the selected robots, moving at the expected movement speed, within the remaining time, and after generating a first one of the second sub-routes, when generating subsequent ones of the second sub-routes, the ending route point of one of the second sub-routes is designated to be the starting route point of a next one of the second sub-routes.

9. The method as claimed in claim 6, wherein sub-step D5) includes:

D51) based on the route points of the priority route, the expected movement speed of the autonomous robots and the workhour quota, generating a starting route point and an ending route point that define one of the second sub-routes; and D52) repeating sub-step D51) until the plurality of second sub-routes have all been generated, wherein each of the second sub-routes is generated to have a length that can be covered by one of the selected robots, moving at the expected movement speed, within the workhour quota, and after generating a first one of the second sub-routes, when generating subsequent ones of the second sub-routes, the ending route point of one of the second sub-routes is designated to be the starting route point of a next one of the second sub-routes.

10. The method as claimed in claim 6, wherein step D) further includes, between sub-steps D2) and D3), generating a message indicating that the maintenance operations for the inputted priority section cannot be fully completed within the remaining time, and transmitting the message to the user device for display of the message on the user device.

* * * * *